Figure 1:
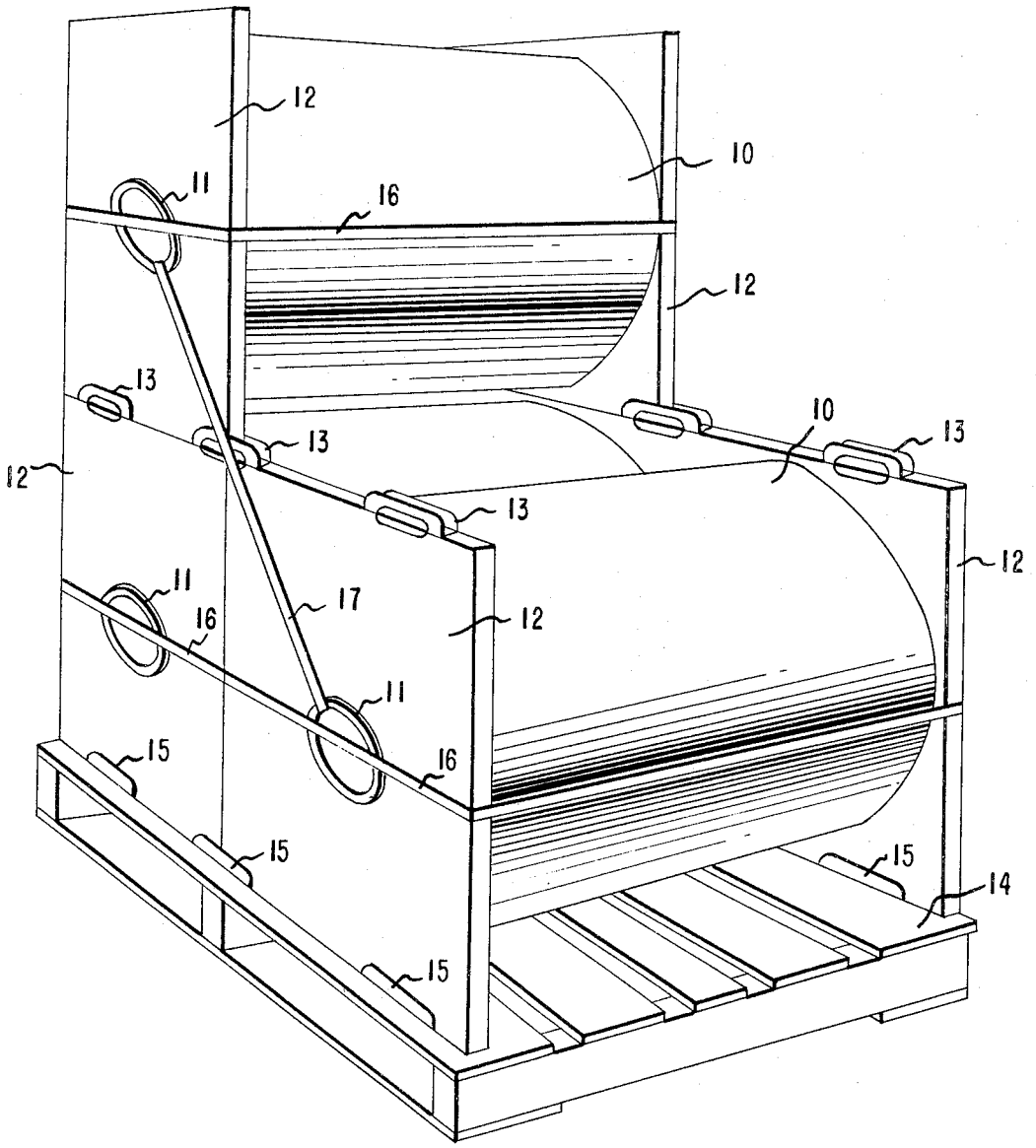

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JUNE 1, 1976

947 O.G. 12

T947,001

TIERED PACKAGE ASSEMBLY

Anthony Louis Mavredes, Wilmington, Del., assignor to E. I. du Pont de Nemours & Company, Wilmington, Del.

Continuation of abandoned application Ser. No. 391,470, Aug. 24, 1973. This application May 2, 1975, Ser. No. 573,992

Int. Cl. B65d *21/00*

U.S. Cl. 206—504

2 Sheets Drawing. 6 Pages Specification

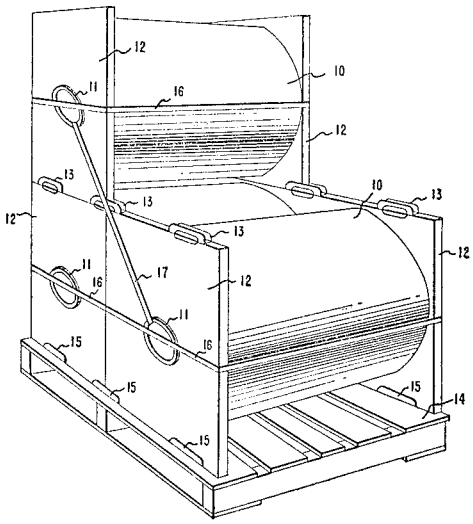

A tiered assembly of like packages horizontally supported between vertically positioned, flat end suspension panels is interlocked by means of clips engaging the panels of adjacent packages. Each clip has a planar central section with parallel lateral sides with at least one lip projecting upwardly from each side and at least one flap projecting downwardly from each side. The central section has at least one sharp projection extending from at least one of its surfaces adapted to engage the outermost edge surfaces of the end suspension panels upon which they bear.

FIG. 2
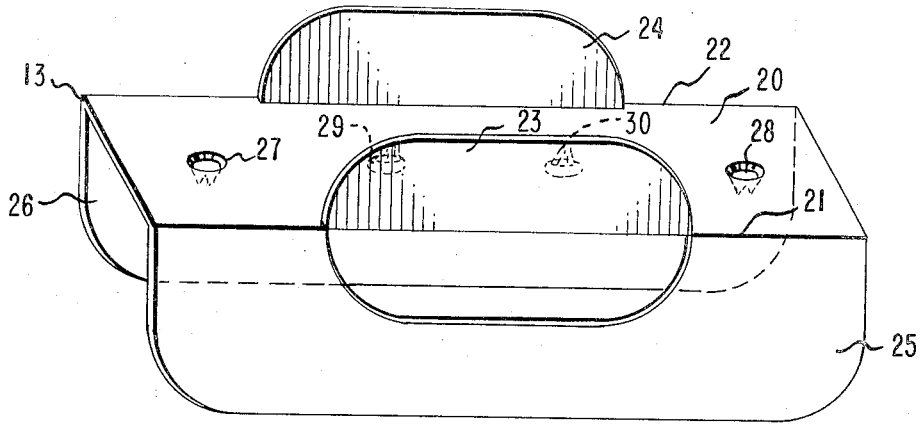
FIG. 3
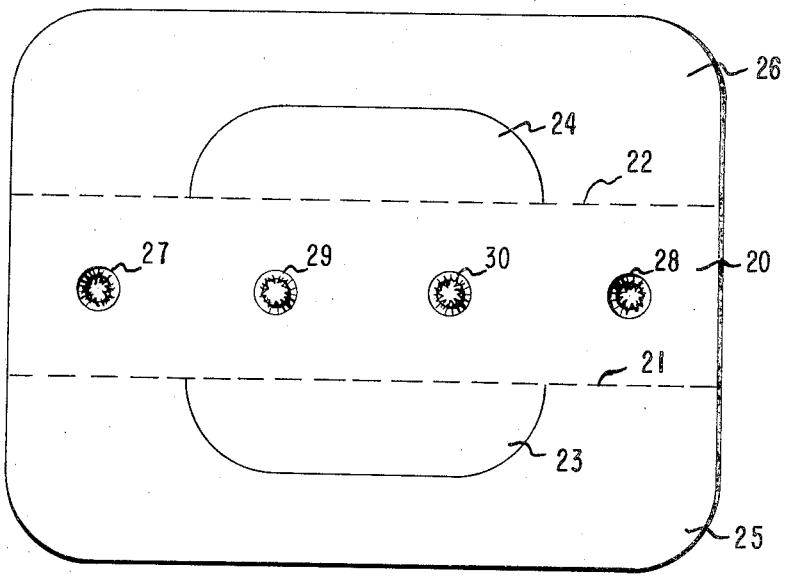
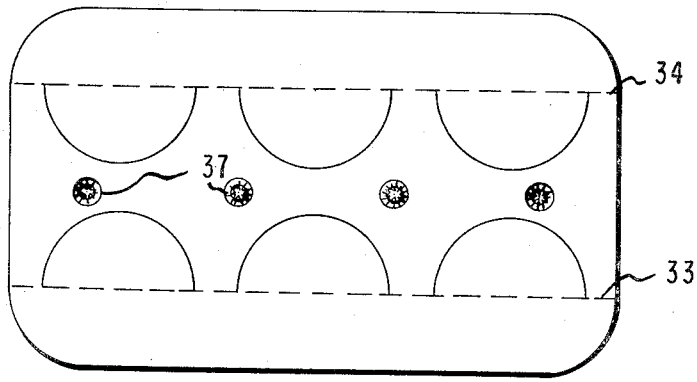
FIG. 5
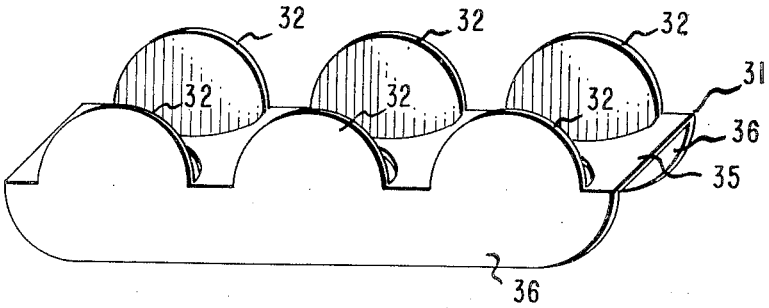
FIG. 4